(12) United States Patent
Prommersberger et al.

(10) Patent No.: US 7,384,613 B2
(45) Date of Patent: Jun. 10, 2008

(54) CATALYST FOR AN INTERNAL COMBUSTION ENGINE

(75) Inventors: Holger Prommersberger, Korntal-Münchingen (DE); Jochen Hägele, Esslingen (DE); Georg Wirth, Kirchheim/Teck (DE)

(73) Assignee: J. Eberspächer GmbH & Co. KG, Esslingen (DE)

( * ) Notice: Subject to any disclaimer, the term of this patent is extended or adjusted under 35 U.S.C. 154(b) by 722 days.

(21) Appl. No.: 10/421,155

(22) Filed: Apr. 23, 2003

(65) Prior Publication Data

US 2004/0213707 A1 Oct. 28, 2004

(30) Foreign Application Priority Data

Apr. 22, 2002 (DE) ................................ 102 17 925

(51) Int. Cl.
*B01D 53/34* (2006.01)
*B01D 50/00* (2006.01)
(52) U.S. Cl. ..................... 422/179; 422/180; 422/177; 422/171; 422/211; 422/222
(58) Field of Classification Search ............... 422/179, 422/180, 177, 171
See application file for complete search history.

(56) References Cited

U.S. PATENT DOCUMENTS 5,094,072 A 3/1992 Ampferer et al.

5,190,732 A 3/1993 Maus et al.
6,899,853 B1 * 5/2005 Diez et al. ................. 422/179
2003/0202917 A1 * 10/2003 Ashida et al. .............. 422/180

FOREIGN PATENT DOCUMENTS

EP 0 471 175 A1 6/1991
EP 0 758 048 A1 5/1996

* cited by examiner

*Primary Examiner*—Glenn Caldarola
*Assistant Examiner*—Kaity Handal

(57) ABSTRACT

The present invention relates to a catalyst for an internal combustion engine, particularly of a motor vehicle, with a housing, which is assembled from at least two housing portions, telescopically inserted one into another in the throughflow direction of the housing, which is assembled from two housing portions telescopically inserted one into the other. A first monolith is mounted in a first housing portion, and a second monolith is mounted in a second housing portion. In an insertion region, an outer end section of the second housing portion and an inner end section of the first housing portion inserted into the outer end section mutually overlap. A transition zone, in which the monoliths, are spaced apart from one another in the throughflow direction, is formed within the insertion region. In this transition zone, the cross sections of the housing portions are matched to each other such that a gap is formed, passing around, closed in the circumferential direction, between the inner end section and the outer end section.

14 Claims, 2 Drawing Sheets

CATALYST FOR AN INTERNAL COMBUSTION ENGINE

CROSS-REFERENCES TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention relates to a catalyst for an internal combustion engine, in particular of a motor vehicle.

Such a catalyst usually has a housing in which two monoliths are accommodated one behind the other in the throughflow direction.

SUMMARY OF THE INVENTION

The present invention is concerned with the problem of giving an improved embodiment of a catalyst of the kind mentioned at the beginning and which in particular has a relatively long lifetime and can be produced relatively inexpensively.

This problem is solved by a catalyst for an internal combustion engine having a throughflow direction, particularly of a motor vehicle, comprising a housing, which is assembled from at least two housing portions, telescopically inserted one into another in the throughflow direction of the housing, wherein a first monolith is mounted in a first housing portion, wherein a second monolith is mounted in a second housing portion, wherein, in an insertion region, an outer end section of the second housing portion and an inner end section of the first housing portion inserted into the outer end section mutually overlap, wherein a transition zone, in which the first and second monoliths are spaced apart from one another in the throughflow direction, is formed within the insertion region, wherein in the transition zone, the cross sections of the first and second housing portions are matched to each other such that a gap is formed transversely of the throughflow direction, passing around, closed in the circumferential direction, between the inner end section and the outer end section.

The invention is based on the general concept of constructing the housing of plural portions, such that individual housing portions are inserted telescopically one into another and form an outwardly thermally insulating gas volume in the insertion region between the monoliths. The provision of the thermally insulating gas volume here takes place by means of a suitable shaping of the housing portions inserted one into another in the insertion region, such that an inserted end section of the one housing portion ends freely in the other housing portion, and separates the gas volume, closed in the circumferential direction, passing around between it and the other housing portion, transversely of the throughflow direction from the housing inner space through which there is a direct throughflow. The formation of a thermally insulating gas volume in a suitable gap space is also termed "gas gap insulation". By means of such a gas gap insulation, the thermal loading of the housing in the section between the monoliths can be considerably reduced, due to which the heat radiation in this region to the outside of the housing is also considerably reduced. This has the consequence that the thermal expansion effects which arise are also reduced, so that the lifetime of the housing and of the monolith mounting is increased.

The integration of the gas gap insulation into the insertion region of the housing portions inserted one into another thus makes possible a simple structure of the housing, which can be produced inexpensively. In particular, no separate component is required to provide the gas gap insulation, and e.g. an additional weld seam to fasten such a component can be dispensed with.

The inserted or telescopic assembly of the housing portions furthermore makes it possible to equalize in a particularly simple way length tolerances of the housing portions in that the housing portions being assembled are correspondingly aligned relative to one another in the insertion or telescoping direction, before the inserted connection is fixed, e.g. by means of a weld seam.

The gap containing the thermally insulating gas volume appropriately extends in the throughflow direction substantially from the first monolith to the second monolith. The whole transition zone between the successive monoliths is thermally insulated to the outside by means of this form of construction.

In an advantageous development, an inner end section of the first housing portion can have at its free end substantially the same cross section as the second monolith. It is ensured by this construction that the monolith mounting enveloping the second monolith, as a rule a suitable mounting mat, is not directly exposed to the hot gas flow. To this extent, the monolith mounting of the second monolith is thermally protected by the gas gap insulation.

Further important features and advantages of the invention will be apparent from the dependent claims, from the drawings, and from the associated description of the Figures using the accompanying drawings.

It will be understood that the features mentioned hereinabove and to be further explained hereinafter can be used not only in the respectively given combination but also in other combinations or alone, without departing from the scope of the present invention.

Preferred embodiment examples of the invention are shown in the drawings and are explained in detail in the following description, where like reference numerals relate to like or functionally like or similar components.

DETAILED DESCRIPTION OF THE INVENTION

Figure 1:
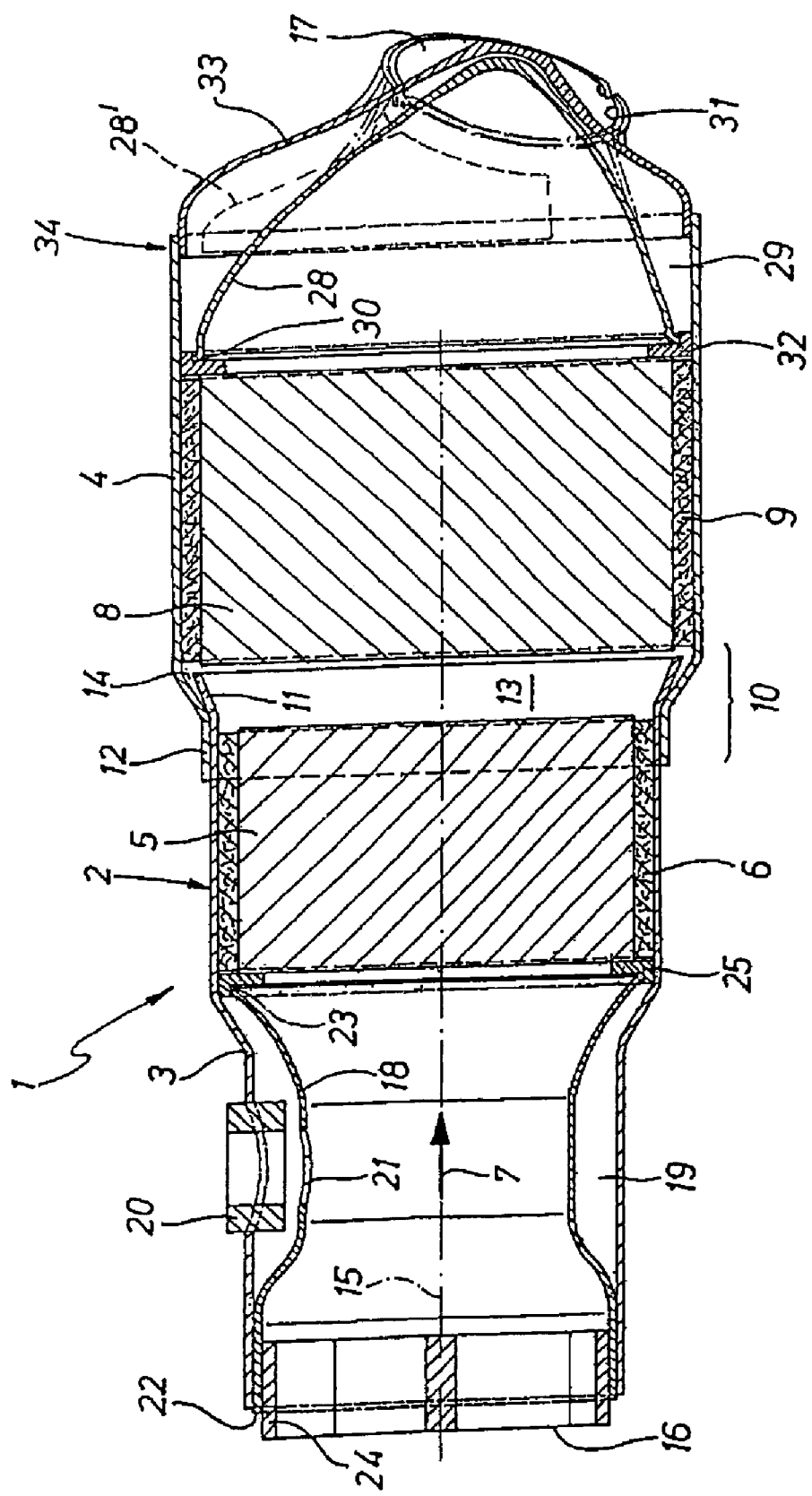
FIGS. 1 and 2 respectively show schematically a longitudinal section through a catalyst according to the invention, in different embodiments.
Figure 2:
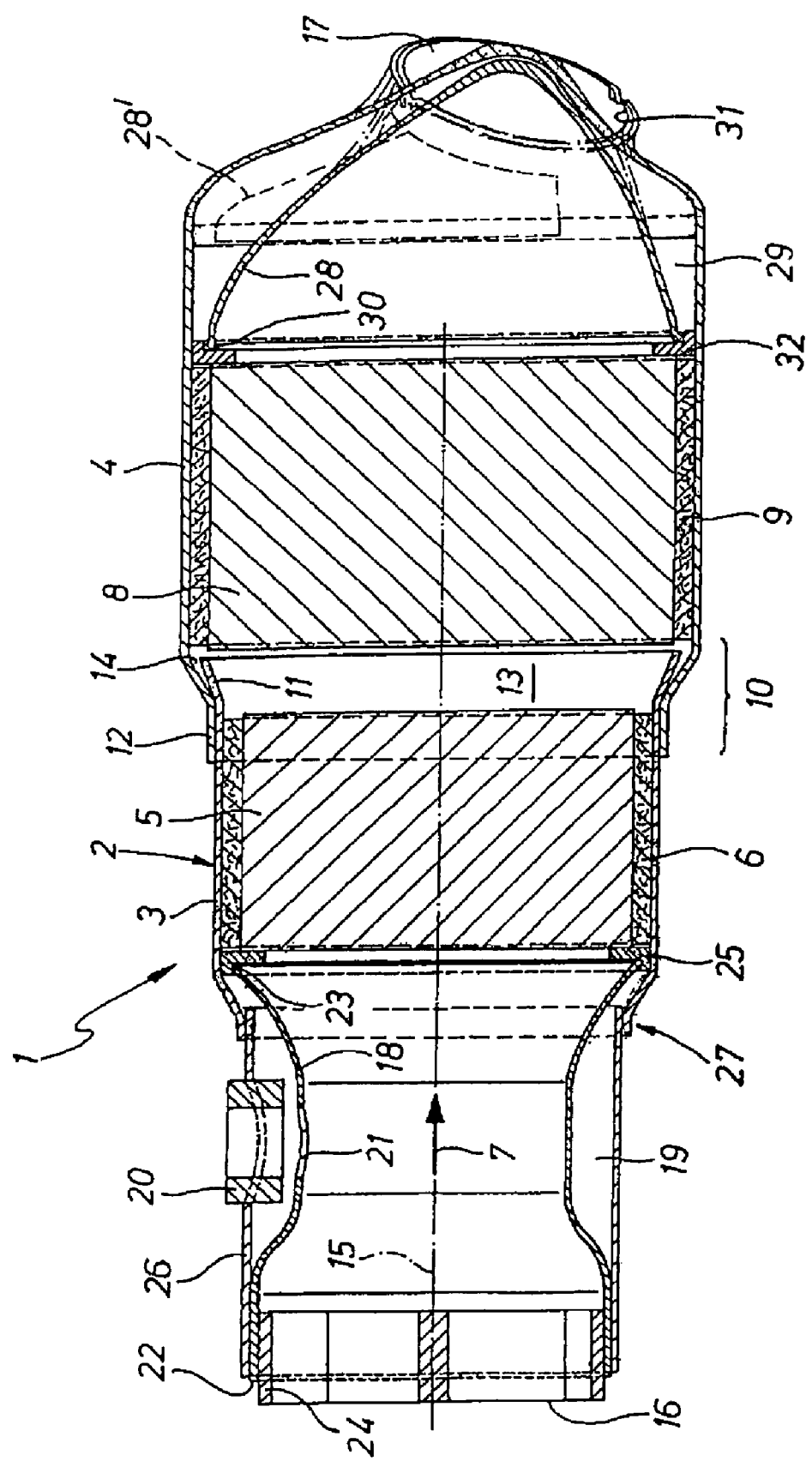

According to FIGS. 1 and 2, a catalyst 1 comprises a housing 2, which is assembled from plural housing portions, at least from a first housing portion 3 and a second housing portion 4. Such a catalyst 1 is as a rule used for an internal combustion engine of a motor vehicle for exhaust gas cleaning, for which purpose the catalyst 1 is used in an exhaust gas system of the internal combustion engine.

A first monolith 5 is mounted in the first housing portion 3 by means of a first monolith mounting 6 which envelops the first monolith 5 in the circumferential direction, transversely of a throughflow direction indicated by an arrow 7. Such a monolith mounting 6 is as a rule formed by a suitable mounting mat.

A second monolith 8 is also mounted in a corresponding manner in the second housing portion 4, and is enveloped for this purpose with a second monolith mounting 9.

The two housing portions 3 and 4 are inserted telescopically one into another in a insertion region 10 denoted by a brace. Here an inner end section 11 of the first housing portion 3 is inserted into an outer end section 12 of the second housing portion 4 such that the end sections 11 and 12 mutually overlap in the insertion region 10. In this insertion region 10, a transition zone 11 in which the monoliths 5 and 8 are spaced apart from each other in the throughflow direction 7 is furthermore formed in the interior of the housing 2.

The first monolith 5 has a smaller cross section than the second monolith 8. In the preferred embodiment shown here, the first monolith 5 is arranged upstream of the second monolith 8. Basically, the throughflow direction 7 could also be directed in the reverse direction.

According to the invention, a gap 14 is formed transversely of the throughflow direction 7, and passes around, closed in the circumferential direction, between the inner end section 11 and the outer end section 12. This gap 14 is formed such that in the transition zone 13 the cross sections of the two housing portions 3 and 4 are mutually matched in a corresponding manner.

Since the gap 14 and thus the thermally insulated gas volume within it are implemented by means of the internal end section 11 projecting into the second housing portion 4, this "gas gap insulation" is quasi integrated into the insertion region 10 without the necessity for an additional, separate component.

Such a gas gap insulation prevents direct exposure of the housing 2 to the hot exhaust gases flowing through the catalyst 1 in operation. The gas volume present in the gap 14 serves as thermal insulation and protects on the one hand the housing 2 and on the other hand the mounting 9 of the second monolith 8 from the hot exhaust gases. At the same time, the heat radiation of the housing between the monoliths 5 and 8 is reduced. Thermal expansion effects are furthermore reduced exactly in the insertion region 10 in which the two housing portions 3 and 4 are welded together. The durability of the housing 2 and of the mounting 9 of the second monolith 8 can thereby be improved.

In the embodiment shown here, the catalyst 1 has a longitudinal axis 15 with respect to which the two housing portions 3 and 4 and also the monoliths 5 and 8 are coaxially arranged.

The outer end section 12 of the second housing portion 4 is constricted to the cross section of the first housing portion 3 upstream of the transition zone 13, so that the outer end section 12 comes into abutment with the outer side of the first housing portion 3 and is appropriately welded there to the first housing portion 3. The outer end section 12 correspondingly has a cross section tapering to abutment on the first housing portion 3.

So that the gap 14 extends as far as possible over the whole transition zone 13, the inner end section 11 of the first housing portion 3 extends nearly as far as the second monolith 8 in the second housing portion 4. Here the cross section of the inner end section 11 is widened from the first monolith 5 to the second monolith 8. The dimensioning of the inner end section 11 is appropriately chosen such that it has at its free end about the same cross section as the second monolith 8. On the one hand it is thereby ensured that the whole cross section of the second monolith 8 for throughflow is exposed to exhaust gas. On the other hand, it is ensured by this dimensioning that the gap 14 it at least so large that the second monolith mounting 9 of the second monolith 8 is substantially not exposed to the exhaust gas flow. The dimensioning of the gap 14 is accordingly chosen so that the thermally insulating gas volume contained therein also protects the mounting 9 of the second monolith 8.

It is of particular importance here that the inclination of the tapering region of the outer end section 12 with respect to the throughflow direction 7 or with respect to the longitudinal axis 15 is chosen to be greater than the inclination of the widening-out region of the inner end section 11. This shape ensures that on assembling the two housing portions 3 and 4, the gap 14 is present in every case between the end sections 11 and 12, independently of the position relative to each other in which the two housing portions 3 and 4 are positioned with respect to the throughflow direction 7.

The housing 2 furthermore contains a housing inlet 16 and a housing outlet 17. An inlet member 18 extends within the housing 2 from the housing inlet 16 as far as the first monolith 5 and is likewise aligned coaxially of the longitudinal axis 15. This inlet member 18 is shaped so that a first cavity 19 is formed transversely of the throughflow direction 7, passing around, closed in the circumferential direction, between the inlet member 18 and the housing 2. A gas volume is enclosed in this first cavity 19 and has a thermally insulating effect and protects the housing 2 from direct exposure to the hot exhaust gases.

A probe connection 20, at which a probe, particularly a lambda probe, can be connected to the housing 2, is furthermore formed on the housing 2 in the region of this first cavity 19. Aligned with this probe connection 20, the inlet member 18 has a probe aperture 21 through which the probe projects into the interior of the inlet member 18 and thus into the exhaust gas flow when the probe is connected to the catalyst 1.

The inlet member 18 has an inlet end 22 and an outlet end 23. The inlet member 18 is fastened to the housing 2 in the region of its inlet end 22, for example by a corresponding weld seam. An inlet block 24 is inserted here in the inlet end 22, and by means of it e.g. one or more exhaust gas manifolds of the internal combustion engine can be connected to the catalyst 1.

The outlet end 23 of the inlet member 18 is retained in the housing 2 by means of a first positioning ring 25. This first positioning ring 25 has an L-shaped profile, into which the outlet end 23 is inserted. The first positioning ring 25 borders the outlet end 23 of the inlet member 18 radially outward in the circumferential direction and is radially supported on the housing 2 and axially on the inlet member 18 on the one hand and on the first monolith 5 on the other hand. The first positioning ring 25 is axially fixed by the introduction of the first monolith 5, and the free outlet end 23 of the inlet member 18 is thereby simultaneously positioned.

The first positioning ring 25 is arranged here in the first housing portion 3, in which the first monolith 5 is also accommodated. In the embodiment according to FIG. 1, the inlet end 22 of the inlet member 18 is also accommodated in the first housing portion 3. In the embodiment according to FIG. 2, differing from this, an inlet housing portion 26 is provided in which the inlet end 22 of the inlet member 18 is arranged. The connection of the inlet housing portion 26 to the first housing portion 3 takes place here in that the two housing portions 3 and 26 are inserted telescopically one into another and are welded together in an insertion region 27.

In the embodiments shown here, the housing 2 furthermore contains an outlet member 28 which extends from the housing outlet 17 as far as the second monolith 8. A second cavity 29 is also formed here transversely of the throughflow direction 7, and passes around, closed in the circumferential direction, between the outlet member 28 and the housing 2. This second cavity 29 also contains a thermally insulating gas volume by means of which the housing 2 is protected from direct exposure to the hot exhaust gases.

The outlet member 28 also has an inlet end 30 and an outlet end 31. A second positioning ring 32 is provided for retaining the outlet member 28 in the housing 2, and likewise has an L-shaped profile into which the inlet end 30 is inserted. The second positioning ring 32 is radially supported on the housing 2 and axially on the second monolith 8, on the one hand, and on the outlet member 28, on the other hand. The outlet end 31 of the outlet member 28 is firmly connected to the housing 2 at the housing outlet 17, particularly by a weld seam. The second positioning ring 32 is fixed by the introduction of the second monolith 8 into the housing 2, and the positioning of the free inlet end 30 of the outlet member 28 takes place thereby.

The second positioning ring 32, and thus the inlet end 30 of the outlet member 28, are arranged here in the second housing portion 4 in which the second monolith 8 is also situated. In the embodiment according to FIG. 1, a separate outlet housing portion 33 is fastened to the second housing portion 4; here also, the outlet housing portion 33 is appropriately inserted into the second housing portion 4 and appropriately welded thereto in an insertion region 34. Differing therefrom, in the embodiment according to FIG. 2 the section of the housing 2 containing the housing outlet 17 can be formed integrally or in one piece on the second housing portion 4.

FIGS. 1 and 2 show a further distinctive feature of the catalyst 1 according to the invention. The second monolith 8 has a given axial length. The second housing portion 4 is dimensioned such that another second monolith 8 can be inserted therein, and has another, e.g. a greater, axial length. In order to implement such an alternative, the second housing portion 4 and thus the outer contour of the catalyst 1 do not have to be changed; it is only necessary to install another outlet member 28', indicated with dashed lines, instead of the outlet member 28 shown.

The assembly of the catalyst 1 shown in FIG. 1 takes place as follows:

There are successively inserted into the first housing portion 3 from the right, that is, against the flow direction 7, the inlet member 18, the first positioning ring 25, and the first monolith 5 including the associated monolith mounting 6. Simultaneously or later, the inlet block 24 can be inserted into the inlet member 18 from the left, that is, in the flow direction 7. Then there are successively inserted into the second housing portion 4 from the right the first housing portion 3, the second monolith 8 including the associated monolith mounting 9, the second positioning ring 32, the outlet member 28, and the outlet housing portion 33. The required weld seams are made at the suitable time points, particularly after a possibly required length equalization with which the tolerances of the housing portions 3, 4 in the insertion direction or respectively in the length direction can be eliminated, in that the housing portions 3, 4 and possibly 33 are correspondingly displaced relative to one another in the respective insertion region 10 or 34.

The assembly of the catalyst 1 according to FIG. 2 takes place, for example, as follows:

Insertion of the inlet housing portion 26 into the first housing portion 3; insertion of the inlet member 18, the first positioning ring 25, and the first monolith 5 including the associated monolith mounting 6 from the right into the first housing portion 3 or respectively into the inlet housing portion 26. Then the outlet member 28, the second positioning ring 32, the second monolith 8 with the associated mounting 9, and the first housing portion 3 are inserted from the left into the second housing portion 4. Here the second housing portion 4 does not yet possess in the insertion region 10 at this time point its cross section constriction at its outer end section 12. This is produced by a corresponding forming process only after the insertion of the first housing portion 3.

We claim:

1. Catalyst for an internal combustion engine having a throughflow direction, particularly of a motor vehicle, comprising:
    a housing (2), which is assembled from at least two housing portions (3, 4), telescopically inserted one into another in the throughflow direction (7) of the housing (2),
    wherein a first monolith (5) is mounted in a first housing portion (3),
    wherein a second monolith (8) is mounted in a second housing portion (4),
    wherein, in an insertion region (10), an outer end section (12) of the second housing portion (4) and an inner end section (11) of the first housing portion (3) inserted into the outer end section (12) mutually overlap,
    wherein a transition zone (13), in which the first and second monoliths (5, 8) are spaced apart from one another in the throughflow direction (7), is formed within the insertion region (10),
    wherein in the transition zone (13), the cross sections of the first and second housing portions (3, 4) are matched to each other such that a gap (14) is formed transversely of the throughflow direction (7), passing around, closed in the circumferential direction, between the inner end section (11) and the outer end section (12),
    wherein the inner end section (11) of the first housing portion (3) has a cross section which widens out toward the second monolith (8),
    wherein the outer end section (12) of the second housing portion (4) has a cross section which tapers as far as abutment on the first housing portion (3), and
    wherein in its tapering region, the outer end section (12) is more strongly inclined with respect to the throughflow direction (7) in the insertion region (10) than the widening region of the inner end section (11).

2. Catalyst according to claim 1, wherein the gap (14) extends in the throughflow direction (7) substantially from the first monolith (5) as far as the second monolith (8).

3. Catalyst according to claim 1, wherein the inner end section (11) of the first housing portion (3) has at its free end substantially the same cross section as the second monolith (8).

4. Catalyst according to claim 1, wherein the housing (2) contains an inlet member (18) which extends from a housing inlet (16) as far as the monolith (5) arranged upstream, a first cavity (19) being formed, closed in the circumferential direction, passing around between the inlet member (18) and the housing (2).

5. Catalyst according to claim 4, wherein
    an inlet end (22) of the inlet member (18) is fastened to the housing (2), and
    an outlet end . of the inlet member (18) is retained in the housing (2) by means of
    a first positioning ring (25) which surrounds on the outside the outlet end (23) transversely of the throughflow direction (7), the first positioning ring (25) is supported in the throughflow direction (7), on the one hand on the inlet member (18) and on the other hand on the monolith (5) arranged upstream, and transversely of the throughflow direction (7), on the housing (2).

6. Catalyst according to claim 4, wherein the housing (2) has a probe connection (20) in the region of the inlet member (18), and the inlet member (18) has, aligned with the probe connection (20), a probe aperture (21) through which a probe installed on the probe connection (20) projects into the interior of the inlet member (18).

7. Catalyst according to claim 5, wherein the first positioning ring (25) is arranged in that housing portion (3) in which the monolith (5) arranged upstream is also accommodated.

8. Catalyst according to claim 4, wherein the inlet end (22) of the inlet member (18) is arranged in that housing portion (3) in which the monolith (5) arranged upstream is also accommodated.

9. Catalyst according to claim 4, wherein the inlet end (22) of the inlet member (18) is arranged in an inlet housing portion (26), the inlet housing portion (26) and the adjacent housing portion (3) being telescopically inserted one into the other.

10. Catalyst according to claim 1, wherein the housing (2) contains an outlet member (28) which extends from a housing outlet (17) as far as the monolith (8) situated downstream, a second cavity (29) being formed transversely of the throughflow direction (7), closed in the circumferential direction and passing around between the outlet member (28) and the housing (2).

11. Catalyst according to claim 10, wherein an outlet end (31) of the outlet member (28) is fastened to the housing (2), and an inlet end (30) of the outlet member (28) is retained in the housing (2) by a second positioning ring (32) which surrounds the inlet end (30) on the outside transversely of the throughflow direction (7), the second positioning ring (32) being positioned in the throughflow direction (7), on the outlet member (28) and on the monolith (8) arranged downstream, and transversely of the throughflow direction (7), on the housing (2).

12. Catalyst according to claim 10, wherein the second positioning ring (32) is arranged in that housing portion (4) in which the monolith (8) situated downstream is also accommodated.

13. Catalyst according to claim 10, wherein the outlet end of the outlet member (28) is arranged in that housing portion (4) in which the monolith (8) situated downstream is also accommodated.

14. Catalyst according to claim 10, wherein the outlet end (31) of the outlet member (28) is arranged in an outlet housing portion (33), the outlet housing portion (33) and the adjacent housing portion (4) being telescopically inserted one into the other.

* * * * *